Dec. 19, 1950 F. G. PHILO 2,534,830
LEAK DETECTOR
Filed Sept. 13, 1947

INVENTOR
FRANK G. PHILO
BY
Charles F. Kargebh
ATTORNEY

Patented Dec. 19, 1950

2,534,830

UNITED STATES PATENT OFFICE 2,534,830

LEAK DETECTOR

Frank G. Philo, Long Beach, Calif.

Application September 13, 1947, Serial No. 773,842

3 Claims. (Cl. 73—40)

This invention relates to leak detecting devices and has particular reference to a device for detecting leaks in the cooling tubes of steam condensers.

Steam condensers generally comprise a vessel into which the steam is caused to flow, for instance, by means of a suction pump. The vessel is fitted with a multiplicity of metal tubes which pass through the vessel from end to end or from side to side as the case may be. Cooling water is caused to flow through the tubes to cool the surfaces thereof and thereby to cause condensation of steam in the vessel. Occasionally leaks occur in these cooling tubes and this obviously causes serious trouble since the cooling water seeps through the leak into the steam chamber. The seepage or leakage may be very rapid if a partial vacuum is formed in the steam chamber by the action of condensing steam. In the case of marine condenser installations where salt water is used in the cooling tubes, it is especially important that contamination of the fresh water steam should not occur. Heretofore, when a leaky tube is suspected, the condenser has to be shut down and considerable difficulty encountered in determining which of the multiplicity of tubes has sprung a leak before the same can be repaired.

It is the principal object of this invention to provide a simple device for detecting leaks in tubes designed to operate in apparatus where there is normally maintained a pressure differential between the inside and outside of such tubes. Another object of the invention is to provide a simple device for detecting leaks in the cooling tubes of steam condensers. These and other objects will become apparent from the following description of the invention.

Figure 1:
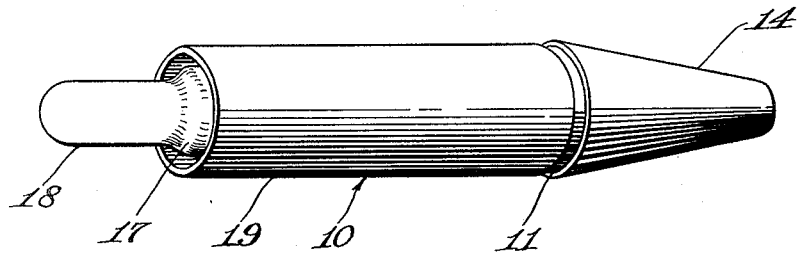
Fig. 1 shows a general perspective view of a preferred embodiment of the device.
Figure 2:
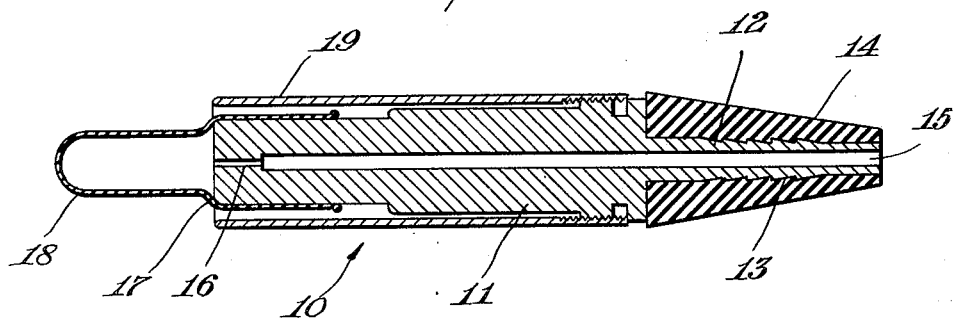
Fig. 2 shows a sectional view of the device shown in Fig. 1.

Referring to Figs. 1 and 2, the leak detector 10, comprises a body portion 11 which as shown, is cylindrical but need not necessarily be so. One end of the body portion 11 is preferably provided with a tubular extension as shown at 12 which may be an integral part of the body portion 11 or a separate piece joined thereto. As shown, this extension 12 is preferably provided with serrations or ridges 13 which facilitates the gripping of a frustoconical tip 14 which is transfixed by the extension 12. This frustoconical tip is preferably formed of a resilient material such as rubber or the like.

The provision of the extension 12 transfixing the frustoconical tip 14 represents a preferred embodiment of the invention. In such embodiment, the frusto-conical tip enables the device to be used on a variety of tube sizes which normally have inside diameters ranging from about one and one-half inches to one-half inch and at the same time insure an air-tight seal. Thus the slope of the tip 14 may be varied as desired and there may be provided several tips having different slopes designed to fit tubes within a portion of the specified range or any other inside diameter. However, as will be understood, the invention is not limited to devices provided with the extension and frusto-conical resilient tip, but embraces alternate methods by which the device may be made to fit tightly over the condenser tube, for instance, the provision of a rubber washer which may fit partially within and partially outside the tube, or may be positioned wholly outside the tube.

The body portion 11 is bored through as at 15 to provide a channel communicating with both ends of the body portion. Preferably this channel has a restricted bore at one end as shown at 16. Over this end of the body portion 11 is attached flexible sac 17 which is made of rubber or the like material, thus sealing this end of the channel. Sac 17 is preferably formed with nipple shaped portion 18. The open end of the sac 17 may be secured around the body in any convenient manner or may be of such dimensions as to have to be stretched into position thus maintaining placement by resilient tension. Suitable gripping or guard means as element 19 may be provided, if desired, and this may be knurled or ridged to facilitate handling.

Figure 3:
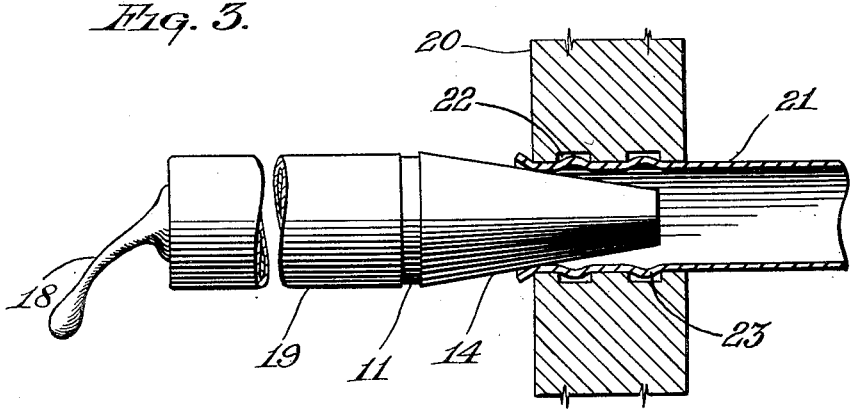
Fig. 3 shows a partly broken out view of the device of Fig. 1 placed in operating position in a steam condenser tube and indicating a leak therein.

Operation of the device of this invention will become apparent from consideration of Fig. 3 in which 20 represents a wall of a steam condenser penetrated by one end of cooling tube 21. The wall 20 may be provided with annular grooves 22 into which portions of the tube are pressed as at 23 so as to fix and seal the end of the tube in the wall. To test a suspected leaky tube the testing device 10 is firmly pressed into the open end of tube 21, the frusto-conical tip 14 providing an effective resilient wedge to seal the open tube and to maintain the device in position. A partial vacuum is then produced in the condenser body outside the tube and if the tube has a leak, it, and the sac 17 will become partially evacuated and when this occurs, the nipple portion 18 will collapse as illustrated. Restricted opening 16 of the channel 15 is effective in preventing a sucking back of the collapsed nipple portion of sac into the channel.

Assuming that the device was employed to detect a leak in an apparatus designed to operate at a higher pressure on the outside of the tubes than on the inside, a leak in the tube would be indicated by a ballooning of the nipple portion of the flexible sac.

While the leak tester of this invention has been described and illustrated with reference to the embodiment shown, other modifications and variations may be employed as limited by the following claims.

I claim:

1. A device for detecting leaks in tubes by indication of sub-atmospheric pressure therein comprising a body, a generally frusto-conical resilient tip firmly transfixed by one end of said body and a flexible sac attached to the other end of said body portion, said body portion having a channel extending longitudinally therethrough and communicating with the interior of said flexible sac through a restricted opening.

2. A device for detecting leaks in tubes by indication of sub-atmospheric pressure therein comprising a body, a generally frusto-conical resilient tip firmly transfixed by one end of said body, and a flexible sac having a nipple shaped portion attached to the other end of said body portion, said body portion having a channel extending longitudinally therethrough and communicating with the interior of said flexible sac through a restricted opening.

3. A device for detecting leaks in tubes by indication of sub-atmospheric pressure therein comprising a body, finger gripping means attached to said body, a generally frusto-conical resilient tip firmly transfixed by one end of said body and a flexible sac attached to the other end of said body portion, said body portion having a channel extending longitudinally therethrough and communicating with the interior of said flexible sac through a restricted opening.

FRANK G. PHILO.

REFERENCES CITED

The following references are of record in the file of this patent:

UNITED STATES PATENTS

| Number | Name | Date |
|---|---|---|
| 1,270,073 | Thiem | June 18, 1918 |
| 1,384,888 | Carlisle | July 19, 1921 |
| 1,988,198 | German | Jan. 15, 1935 |
| 2,118,703 | Giaimo | May 24, 1938 |